Jan. 9, 1934.    M. E. HENNING    1,942,700
SWITCH STRUCTURE
Filed Feb. 17, 1932
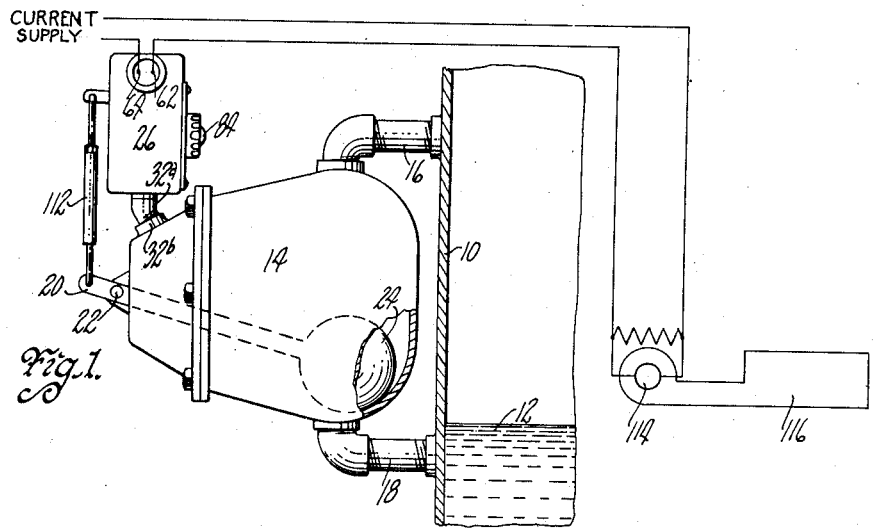
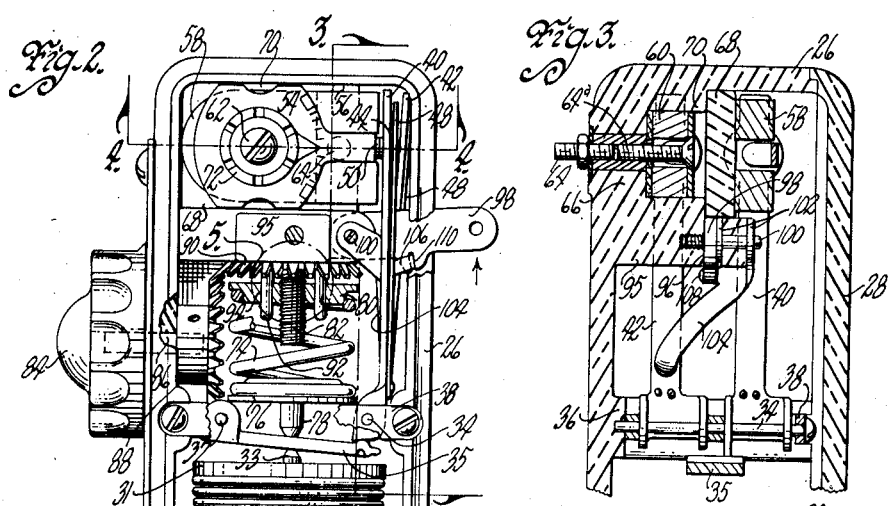
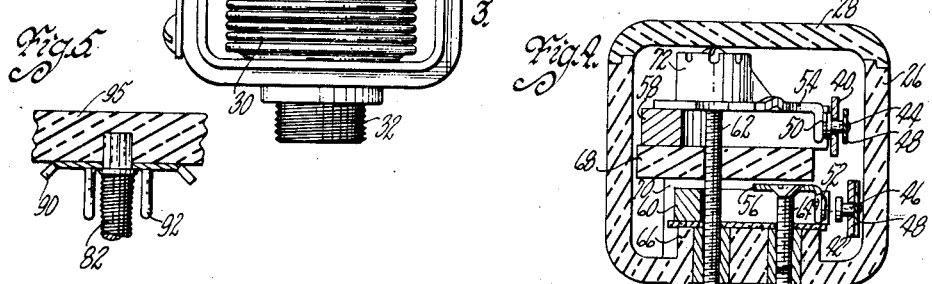

Patented Jan. 9, 1934

1,942,700

UNITED STATES PATENT OFFICE 1,942,700

SWITCH STRUCTURE

Malcolm E. Henning, Des Moines, Iowa, assignor to Penn Electric Switch Co., Des Moines, Iowa, a corporation of Iowa Application February 17, 1932. Serial No. 593,571

6 Claims. (Cl. 200—83)

An object of my invention is to provide a switch structure including both a pressure responsive and a liquid level responsive switch, the switch structure itself being comparatively simple and inexpensive.

A further object is to provide a combined pressure and float switch for use with a boiler or the like having water or other liquid therein and a burner for the boiler, such switch structure being connected with the burner so as to shut down the operation thereof whenever either an excessively high pressure or an excessively low liquid level is encountered.

A further object is to provide a switch structure having a pressure actuated switch and a float actuated switch independently operable but connected in series with each other and with a control device to de-energize the control device, depending on pressure and liquid level conditions.

A further object is to provide a switch structure having novel mechanical characteristics.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a float chamber attached to a boiler with my switch structure connected with the float chamber and a burner shown diagrammatically and controlled by the switch structure.

Figure 2 is a reverse elevation of the switch in Figure 1 showing it enlarged and the cover for the casing removed.

Figures 3 and 4 are sectional views on the lines 3—3 and 4—4, respectively, of Figure 2 illustrating details of construction; and Figure 5 is an enlarged sectional view of the portion of Figure 2 within the circle 5.

On the accompanying drawing, I have used the reference numeral 10 to indicate a boiler or the like. Water 12 is indicated therein. A float chamber 14 is connected by pipes 16 and 18 with the boiler 10. The pipes 16 and 18 communicate with the boiler above and below the normal water level.

A float arm 20 is pivoted at 22 and extends into the float chamber 14. A float 24 is mounted on the inner end thereof. Suitable packing such as of the bellows type is ordinarily provided in connection with a float chamber of this character, but is not illustrated on the drawing. The float chamber itself forms no part of my present invention.

My switch structure includes a casing 26 and a cover 28 therefor. The casing 26 has therein a pressure responsive bellows 30. A threaded projection 32 extends from the bellows 30 and affords communication between the float chamber 14 and the bellows, an elbow fitting 32ª being screwed into a boss 32ᵇ of the chamber 14 for this purpose. Thus pressure within the chamber 14 is transmitted to the bellows 30.

Within the housing 26, a pivot pin 34 has one end extending into a boss 36 and its other end supported by a bar 38.

Pressure and float switch arms 40 and 42, respectively, are pivoted on the pin 34. The switch arms 40 and 42 carry contacts 44 and 46, respectively, the contacts being loosely supported relative to the arms by leaf springs 48. The contacts 44 and 46 are adapted to engage with contacts 50 and 52, respectively, when the switch arms 40 and 42 are in closed circuit positions.

The contacts 50 and 52 are carried by contact plates 54 and 56 which in turn are secured against magnets 58 and 60 by terminal screws 62 and 64. The switch arms 40 and 42 are adjacent the poles of the magnets 58 and 60 when the switch arms are in closed circuit positions.

The magnet 60 is supported on a block 66 of insulation while the magnet 58 is supported on a block 68 of insulation which rests against shoulders 70 formed in the casing 26. The member 72 is an adjustment device for the contact 50 with respect to the poles of the magnet 58, but forms no part of my present invention.

The pressure bellows 30 is opposed by a spring 74, one end of which rests against a flange 76 of a point member 78 and the other end of which rests against a washer 80. The bellows 30 is provided with a head 31 having a point 33. The points 33 and 78 engage opposite sides of a lever 35 which is pivoted at 37 in the same manner that the arms 40 and 42 are pivoted.

The washer 80 is threaded on a stud 82 and may be adjusted relative thereto by means of a knob 84. The knob 84 is secured to one end of a shaft 86 and a bevel gear 88 is secured to the other end thereof. The bevel gear 88 meshes with a bevel gear 90 which is rotatable but non-slidable relative to the stationary stud 82 (see Figure 5).

The bevel gear 90 carries a pair of pins 92 which extend slidably through openings 94 formed in the washer 80. Thus it will be obvious that rotation of the knob 84 will rotate the gear 90 and its pins 92 for thus imparting rotation to the adjusting washer 80. The stud 82 is embedded in a partition 95 of the casing 26.

A slot 96 is formed in the partition 95 (see Figure 3) and a float arm 98 is pivoted therebetween on a pin 100. Also on the pin, ears 102 of a leaf spring 104 are pivoted, one in the slot 96 and the other above the partition 95. The leaf spring 104 has its lower end engaging the switch arm 42 and has an arm like extension 106 with its end 108 bent through a slot 110 of the lever 98.

From the construction of the parts just described, it will be obvious that upward movement of the arm 98 will cause the spring 104 to engage the switch arm 42 and move it away from the magnet 60, as illustrated in Figures 2 and 4.

The float arm 98 is connected by a link 112 with the float arm 20. The link 112 is preferably adjustable in length.

*Practical operation*

The terminals 62 and 64 are connected in circuit with the motor 114 of a burner 116. The burner 116 is for heating the water 12 in the boiler 10 and the installation is ordinarily used in residences or the like for heating water of hot water or steam heating plants. There is danger in such installations of the water supply running low and of excessive pressures being generated in the boiler while the burner is still operating. I have therefore provided a combined water level responsive and pressure responsive switch structure in which subnormally low water level, as illustrated in Figure 1, will allow the float 24 to assume lowered position and open the switch arm 42. This de-energizes the motor 114 when the water level is low.

Also when pressure is high, the bellows 30 will expand and open the switch arm 40 so as to open the circuit to the motor 114. Thus either low water level or high pressure will de-energize the motor and stop the operation of the burner. Such control is automatically attained and is efficiently accomplished by my switch structure wherein separate and independently operated switch arms are provided but they are connected in the same circuit for controlling the same device but depending on different conditions.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a switch structure, a casing, a magnet clamped against one wall thereof, a shoulder above said magnet, a second magnet clamped against said shoulder, a contact adjacent the poles of each magnet, a switch arm for engagement with each contact, pressure responsive means for actuating one of said switch arms and float means for actuating the other of said switch arms.

2. In a switch structure, a casing, a magnet clamped against one wall thereof, a shoulder above said magnet, a second magnet clamped against said shoulder, a contact adjacent the poles of each magnet and a switch arm for engagement with each of said contacts.

3. In a switch structure, a casing, a magnet clamped against one wall thereof, a shoulder adjacent each side of said magnet, a bridge-like support, a second magnet clamped against said bridge-like support, a contact adjacent the poles of each magnet and a switch arm for engagement with each of said contacts.

4. In a switch structure, a casing, a magnet clamped against one wall thereof, a shoulder adjacent each side of said magnet, a bridge-like support, a second magnet, means for clamping said second magnet against said bridge-like support and said bridge-like support against said shoulders, a contact adjacent the poles of each magnet and a switch arm for engagement with each of said contacts.

5. In a switch structure, a casing, a magnet, a terminal for clamping said magnet against one wall of said casing, a shoulder above said magnet, a second magnet, a second terminal for clamping said second magnet against said shoulder, a contact connected with each terminal, a switch arm for engagement with each of said contacts, pressure responsive means for actuating one of said switch arms and float means for actuating the other of said switch arms.

6. In a switch structure, a casing, a magnet, a terminal for clamping said magnet against one wall of said casing, a shoulder above said magnet, a second magnet, a second terminal for clamping said second magnet against said shoulder, a contact connected with each terminal, and a switch arm for engagement with each of said contacts.

MALCOLM E. HENNING.